US011108465B2

United States Patent
Gao et al.

(10) Patent No.: US 11,108,465 B2
(45) Date of Patent: Aug. 31, 2021

(54) LANE BONDING IN PASSIVE OPTICAL NETWORKS (PONS)

(71) Applicant: Futurewei Technologies, Inc., Plano, TX (US)

(72) Inventors: Jianhe Gao, Wuhan (CN); Yuanqiu Luo, Cranbury, NJ (US); Xuming Wu, Wuhan (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/917,401

(22) Filed: Jun. 30, 2020

(65) Prior Publication Data

US 2020/0336209 A1    Oct. 22, 2020

Related U.S. Application Data

(63) Continuation of application No. 15/433,822, filed on Feb. 15, 2017, now Pat. No. 10,700,783.

(Continued)

(51) Int. Cl.
*H04B 10/27* (2013.01)
*H04B 10/50* (2013.01)
*H04L 1/00* (2006.01)

(52) U.S. Cl.
CPC .......... *H04B 10/27* (2013.01); *H04B 10/50* (2013.01); *H04L 1/0056* (2013.01)

(58) Field of Classification Search
CPC ...... H04B 10/27; H04B 10/272; H04B 10/50; H04L 1/0056; H04Q 11/0067; H04Q 2011/0064

(Continued)

(56) References Cited

U.S. PATENT DOCUMENTS 6,411,410 B1   6/2002   Wright et al.
7,272,321 B1   9/2007   Kuo et al.
(Continued)

FOREIGN PATENT DOCUMENTS

CN    102882801 A    1/2013
CN    103248431 A    8/2013

OTHER PUBLICATIONS

IEEE et al; IEEE Standard for Ethernet; 2012; IEEE Std 802.3; p. 705. (Year: 2012).*

(Continued)

*Primary Examiner* — Amritbir K Sandhu
(74) *Attorney, Agent, or Firm* — Conley Rose, P.C.

(57) ABSTRACT

An apparatus includes a processor configured to determine a set of first lanes associated with a PON, select a subset of second lanes from the set, and perform lane bonding by bonding the subset to an ONU. A transmitter coupled to the processor is configured to transmit a lane bonding assignment to the ONU. An ONU includes a plurality of receivers configured to receive a first message comprising an announcement indicating an OLT lane capability. A processor coupled to the receivers is configured to process the first message and generate a second message in response to the first message, wherein the second message comprises a report indicating an ONU lane capability and prompting lane bonding in a PON. A plurality of transmitters coupled to the processor is configured to transmit the second message to the OLT.

20 Claims, 22 Drawing Sheets

Related U.S. Application Data

(60) Provisional application No. 62/296,924, filed on Feb. 18, 2016.

(58) Field of Classification Search
USPC .................................................. 398/66–79
See application file for complete search history.

(56) References Cited

U.S. PATENT DOCUMENTS

| | | | |
|---|---|---|---|
| 10,069,586 B2 | 9/2018 | Pitzer et al. | |
| 10,374,744 B2* | 8/2019 | Luo | H04J 14/0227 |
| 10,686,524 B2* | 6/2020 | Gao | H04B 10/27 |
| 2005/0041682 A1* | 2/2005 | Kramer | H04Q 11/0067 |
| | | | 370/458 |
| 2005/0058135 A1 | 3/2005 | Sisto et al. | |
| 2005/0249498 A1* | 11/2005 | Haran | H04L 47/13 |
| | | | 398/58 |
| 2007/0133800 A1* | 6/2007 | Kim | H04L 63/0428 |
| | | | 380/256 |
| 2008/0138075 A1 | 6/2008 | Gustlin et al. | |
| 2008/0298806 A1 | 12/2008 | Ellenberger | |
| 2009/0226170 A1 | 9/2009 | Zou | |
| 2010/0177785 A1 | 7/2010 | Kisaka et al. | |
| 2011/0058813 A1 | 3/2011 | Boyd et al. | |
| 2011/0142444 A1* | 6/2011 | Borges | H04Q 11/0067 |
| | | | 398/25 |
| 2011/0194854 A1* | 8/2011 | Freire | H04J 3/1694 |
| | | | 398/58 |
| 2013/0142515 A1 | 6/2013 | Chen et al. | |
| 2013/0202304 A1 | 8/2013 | Boyd et al. | |
| 2013/0272703 A1 | 10/2013 | Fang et al. | |
| 2013/0343761 A1 | 12/2013 | Fang et al. | |
| 2014/0056586 A1 | 2/2014 | Boyde et al. | |
| 2014/0056856 A1 | 2/2014 | Hsu et al. | |
| 2014/0079399 A1* | 3/2014 | Goswami | H04Q 11/0067 |
| | | | 398/76 |
| 2014/0133859 A1 | 5/2014 | Fang et al. | |
| 2014/0186041 A1 | 7/2014 | Shellhammer et al. | |
| 2014/0212128 A1 | 7/2014 | Hirth et al. | |
| 2014/0219660 A1* | 8/2014 | Zhu | H04J 14/0247 |
| | | | 398/67 |
| 2015/0256284 A1 | 9/2015 | Laubach et al. | |
| 2015/0365192 A1* | 12/2015 | Kim | H04J 14/0272 |
| | | | 398/66 |
| 2016/0105253 A1* | 4/2016 | Liu | H04Q 11/0067 |
| | | | 398/67 |
| 2017/0026128 A1 | 1/2017 | Remein et al. | |
| 2017/0070295 A1 | 3/2017 | Remein et al. | |
| 2017/0105061 A1* | 4/2017 | Kim | H04Q 11/0067 |
| 2017/0244487 A1 | 8/2017 | Gao et al. | |
| 2017/0294982 A1 | 10/2017 | Wu et al. | |
| 2017/0317779 A1 | 11/2017 | Wu et al. | |
| 2018/0035183 A1 | 2/2018 | Kim et al. | |
| 2019/0116404 A1 | 4/2019 | Zheng et al. | |
| 2020/0344534 A1* | 10/2020 | Luo | H04Q 11/0067 |

OTHER PUBLICATIONS

Kim et al; Real-time Demonstration of Dynamic MPRS Channel Bonding for the next generation multi-channel 50G-EPON system; Nov. 2018; IEEE Xplore; pp. 1-3. (Year: 2018).*

"IEEE Standard for Ethernet, Section Five" IEEE 802.3-2012, 2012, 844 pages.

"Series G: Transmission Systems and Media, Digital Systems and Networks—Digital Sections and Digital Line System Optical Line Systems for Local and Access Networks—40-Gigabit-Capable Passive Optical Networks (NG-PON2): Transmission Convergence Layer Specification," ITU-T G.989.3, Oct. 2015, 289 pages.

Geng, et al., "Channel Capability Report During Registration for 100G- EPON," Jul. 2017, IEEE 802.3ca task force meeting, 2017, 16 pages.

* cited by examiner

400

| Octets | Description | Values |
|---|---|---|
| 6 | Destination address | |
| 6 | Source Address | |
| 2 | Length/Type | 0x8808 |
| 2 | Opcode | 0x0002 |
| 4 | Timestamp | |
| 1 | Number of grants/Flags | Bit3=1,discovery GATE; Bit3=0,normal GATE |
| 4 | Grant#1 start time | |
| 2 | Grant#1 length | |
| 2 | Sync Time | |
| 2 | Discovery information | |
| 29 | Pad/Reserved | Ignored on reception |
| 4 | FCS | |

410 — Discovery information row
420 — Pad/Reserved row

| Bit | Flag field | Values | Notes |
|---|---|---|---|
| 0 | OLT is 1G upstream capable | 0 – OLT does not support 1 Gb/s reception<br>1 – OLT supports 1 Gb/s reception | |
| 1 | OLT is 10G upstream capable | 0 – OLT does not support 10 Gb/s reception<br>1 – OLT supports 10 Gb/s reception | |
| 2 | OLT is 25G upstream capable | 0 – OLT does not support 25 Gb/s reception<br>1 – OLT supports 25 Gb/s reception | Reserved in 802.3av |
| 3 | OLT is 50G upstream capable | 0 – OLT does not support 50 Gb/s reception<br>1 – OLT supports 50 Gb/s reception | |
| 4 | OLT is opening 1G discovery window | 0 – OLT cannot receive 1 Gb/s data in this window<br>1 – OLT can receive 1 Gb/s data in this window | |
| 5 | OLT is opening 10G discovery window | 0 – OLT cannot receive 10Gb/s data in this window<br>1 – OLT can receive 10Gb/s data in this window | |
| 6 | OLT is opening 25G discovery window | 0 – OLT cannot receive 25 Gb/s data in this window<br>1 – OLT can receive 25 Gb/s data in this window | Reserved in 802.3av |
| 7 | OLT is opening 50G discovery window | 0 – OLT cannot receive 50 Gb/s data in this window<br>1 – OLT can receive 50 Gb/s data in this window | |
| 8 | OLT is opening 100G discovery window | 0 – OLT cannot receive 100 Gb/s data in this window<br>1 – OLT can receive 100 Gb/s data in this window | |
| 9 | OLT is opening N discovery window | 0 – OLT cannot receive N Gb/s data in this window<br>1 – OLT can receive N Gb/s data in this window | |
| 10 | OLT is opening M discovery window | 0 – OLT cannot receive M Gb/s data in this window<br>1 – OLT can receive M Gb/s data in this window | |
| 11 | OLT is opening L discovery window | 0 – OLT cannot receive L Gb/s data in this window<br>1 – OLT can receive L Gb/s data in this window | |
| 12 | OLT is 100G upstream capable | 0 – OLT does not support 100 Gb/s reception<br>1 – OLT supports 100 Gb/s reception | |
| 13 | OLT is upstream N capable | 0 – OLT does not support N Gb/s reception<br>1 – OLT supports N Gb/s reception | |
| 14 | OLT is upstream M capable | 0 – OLT does not support M Gb/s reception<br>1 – OLT supports M Gb/s reception | |
| 15 | OLT is upstream L capable | 0 – OLT does not support L Gb/s reception<br>1 – OLT supports L Gb/s reception | |

| Octets | Description | Values |
|---|---|---|
| 1 | OLT lane amount | 1, one lane; 2, two lanes; 3, three lanes; 4, four lanes; 5, five lanes; 6, six lanes; 7, seven lanes; other values are reserved |
| 1 | OLT lane group amount | 0, no group; 1, one group; 2, two groups; 3, three groups; 4, four groups; 5, five groups; 6, six groups; 7, seven groups; other values are reserved |
| 1 | Lane0 and Lane1 rates | 0xRRRR SSSS<br>RRRR: Lane0 rate (1, 10Gbps; 2, 25/28Gbps; 3, 50/56Gbps; other value are reserved)<br>SSSS: Lane1 rate (1, 10Gbps; 2, 25/28Gbps; 3, 50/56Gbps; other value are reserved) |
| 1 | Lane2 and Lane3 rates | 0xRRRR SSSS<br>RRRR: Lane2 rate (1, 10Gbps; 2, 25/28Gbps; 3, 50/56Gbps; other value are reserved)<br>SSSS: Lane3 rate (1, 10Gbps; 2, 25/28Gbps; 3, 50/56Gbps; other value are reserved) |
| 1 | Lane4 and Lane5 rates | 0xRRRR SSSS<br>RRRR: Lane4 rate (1, 10Gbps; 2, 25/28Gbps; 3, 50/56Gbps; other value are reserved)<br>SSSS: Lane5 rate (1, 10Gbps; 2, 25/28Gbps; 3, 50/56Gbps; other value are reserved) |
| 1 | Lane6 and Lane7 rates | 0xRRRR SSSS<br>RRRR: Lane6 rate (1, 10Gbps; 2, 25/28Gbps; 3, 50/56Gbps; other value are reserved)<br>SSSS: Lane7 rate (1, 10Gbps; 2, 25/28Gbps; 3, 50/56Gbps; other value are reserved) |
| 1 | LaneGroup 0 | Total lane amount in LaneGroup 0, 1 single lane; 2 two lanes; 3 three lanes; 4 four lanes;... |
| 1 | LaneGroup 0 member | 0xHGFE DCBA<br>A=0, Lane0 isn't a member; A=1, Lane0 is a member<br>B=0, Lane1 isn't a member; B=1, Lane1 is a member<br>C=0, Lane2 isn't a member; C=1, Lane2 is a member<br>D=0, Lane3 isn't a member; D=1, Lane3 is a member<br>E=0, Lane4 isn't a member; E=1, Lane4 is a member<br>F=0, Lane5 isn't a member; F=1, Lane5 is a member<br>G=0, Lane6 isn't a member; G=1, Lane6 is a member<br>H=0, Lane7 isn't a member; H=1, Lane7 is a member |
| 1 | LaneGroup1 | Same as "LaneGroup 0" |
| 1 | LaneGroup1 member | Same as "LaneGroup 0 member" |
| 1 | LaneGroup2 | Same as "LaneGroup 0" |
| 1 | LaneGroup2 member | Same as "LaneGroup 0 member" |
| 1 | LaneGroup3 | Same as "LaneGroup 0" |
| 1 | LaneGroup3 member | Same as "LaneGroup 0 member" |
| 1 | LaneGroup4 | Same as "LaneGroup 0" |
| 1 | LaneGroup4 member | Same as "LaneGroup 0 member" |
| 1 | LaneGroup5 | Same as "LaneGroup 0" |
| 1 | LaneGroup5 member | Same as "LaneGroup 0 member" |
| 1 | LaneGroup6 | Same as "LaneGroup 0" |
| 1 | LaneGroup6 member | Same as "LaneGroup 0 member" |
| 1 | LaneGroup7 | Same as "LaneGroup 0" |
| 1 | LaneGroup7 member | Same as "LaneGroup 0 member" |
| 7 | Pad/Reserved | Ignored on reception |

| Octets | Description | Values |
|---|---|---|
| 6 | Destination address | |
| 6 | Source Address | |
| 2 | Length/Type | 0x8808 |
| 2 | Opcode | 0x0004 |
| 4 | Timestamp | |
| 1 | Flags | |
| 1 | pending grant | |
| 2 | Discovery information | |
| 1 | Laser on time | |
| 1 | Laser off time | |
| 34 | Pad/Reserved | Ignored on reception |
| 4 | FCS | |

710 → Discovery information row
720 → Pad/Reserved row

| Bit | Flag field | Values | Notes |
|---|---|---|---|
| 0 | ONU is 1G upstream capable | 0 – ONU transmitter is not capable of 1 Gb/s<br>1 – ONU transmitter is capable of 1 Gb/s | |
| 1 | ONU is 10G upstream capable | 0 – ONU transmitter is not capable of 10 Gb/s<br>1 – ONU transmitter is capable of 10 Gb/s | |
| 2 | ONU is 25G upstream capable | 0 – ONU transmitter is not capable of 25 Gb/s<br>1 – ONU transmitter is capable of 25 Gb/s | Reserved in 802.3av |
| 3 | ONU is 50G upstream capable | 0 – ONU transmitter is not capable of 50 Gb/s<br>1 – ONU transmitter is capable of 50 Gb/s | |
| 4 | 1G registration attempt | 0 – 1 Gb/s registration is not attempted<br>1 – 1 Gb/s registration is attempted | |
| 5 | 10G registration attempt | 0 – 10 Gb/s registration is not attempted<br>1 – 10 Gb/s registration is attempted | |
| 6 | 25G registration attempt | 0 – 25 Gb/s registration is not attempted<br>1 – 25 Gb/s registration is attempted | Reserved in 802.3av |
| 7 | 50G registration attempt | 0 – 50 Gb/s registration is not attempted<br>1 – 50 Gb/s registration is attempted | |
| 8 | 100G registration attempt | 0 – 100 Gb/s registration is not attempted<br>1 – 100 Gb/s registration is attempted | |
| 9 | N registration attempt | 0 – N Gb/s registration is not attempted<br>1 – N Gb/s registration is attempted | |
| 10 | M registration attempt | 0 – M Gb/s registration is not attempted<br>1 – M Gb/s registration is attempted | |
| 11 | L registration attempt | 0 – L Gb/s registration is not attempted<br>1 – L Gb/s registration is attempted | |
| 12 | ONU is 100G upstream capable | 0 – ONU transmitter is not capable of 100 Gb/s<br>1 – ONU transmitter is capable of 100 Gb/s | |
| 13 | ONU is N upstream capable | 0 – ONU transmitter is not capable of N Gb/s<br>1 – ONU transmitter is capable of N Gb/s | |
| 14 | ONU is M upstream capable | 0 – ONU transmitter is not capable of M Gb/s<br>1 – ONU transmitter is capable of M Gb/s | |
| 15 | ONU is L upstream capable | 0 – ONU transmitter is not capable of L Gb/s<br>1 – ONU transmitter is capable of L Gb/s | |

| Octets | Description | Values |
|---|---|---|
| 1 | ONU lane amount | 1, one lane; 2, two lanes; 3, three lanes; 4, four lanes; 5, five lanes; 6, six lanes; 7, seven lanes; other values are reserved |
| 1 | Lane0 and Lane1 rates | 0xRRRR SSSS<br>RRRR: Lane0 rate (1, 10Gbps; 2, 25/28Gbps; 3, 50/56Gbps; other value are reserved)<br>SSSS: Lane1 rate (1, 10Gbps; 2, 25/28Gbps; 3, 50/56Gbps; other value are reserved) |
| 1 | Lane2 and Lane3 rates | 0xRRRR SSSS<br>RRRR: Lane2 rate (1, 10Gbps; 2, 25/28Gbps; 3, 50/56Gbps; other value are reserved)<br>SSSS: Lane3 rate (1, 10Gbps; 2, 25/28Gbps; 3, 50/56Gbps; other value are reserved) |
| 1 | Lane4 and Lane5 rates | 0xRRRR SSSS<br>RRRR: Lane4 rate (1, 10Gbps; 2, 25/28Gbps; 3, 50/56Gbps; other value are reserved)<br>SSSS: Lane5 rate (1, 10Gbps; 2, 25/28Gbps; 3, 50/56Gbps; other value are reserved) |
| 1 | Lane6 and Lane7 rates | 0xRRRR SSSS<br>RRRR: Lane6 rate (1, 10Gbps; 2, 25/28Gbps; 3, 50/56Gbps; other value are reserved)<br>SSSS: Lane7 rate (1, 10Gbps; 2, 25/28Gbps; 3, 50/56Gbps; other value are reserved) |
| 29 | Pad/Reserved | Ignored on reception |

FIG. 9

1000
| Description | Octets |
|---|---|
| Destination Address | 6 |
| Source Address | 6 |
| Length/Type = 0x8808 | 2 |
| Opcode = 0x0002 | 2 |
| Timestamp | 4 |
| Number of grants/Flags | 1 |
| Grant #1 Start time | 0/4 |
| Grant #1 Length | 0/2 |
| Grant #2 Start time | 0/4 |
| Grant #2 Length | 0/2 |
| Grant #3 Start time | 0/4 |
| Grant #3 Length | 0/2 |
| Grant #4 Start time | 0/4 |
| Grant #4 Length | 0/2 |
| ONU lane report | 1 |
| Pad/Reserved | 14-38 |
| FCS | 4 |
1010 — 
FIG. 10

1100

| Octets | Description | Values |
|---|---|---|
| 6 | Destination address | |
| 6 | Source Address | |
| 2 | Length/Type | 0x8808 |
| 2 | Opcode | 0xTTTT |
| 4 | Timestamp | |
| 1 | ONU lane amount | |
| 1 | Lane0 and Lane1 rates | |
| 1 | Lane2 and Lane3 rates | |
| 1 | Lane4 and Lane5 rates | |
| 1 | Lane6 and Lane7 rates | |
| Rest | Pad/Reserved | |
| 4 | FCS | |

1110 — ONU lane amount
1120 — Lane0 and Lane1 rates
1130 — Lane2 and Lane3 rates
1140 — Lane4 and Lane5 rates
1150 — Lane6 and Lane7 rates

| Octets | Description |
|---|---|
| 42 | ONU lane amount — 1300 |
| 43 | Lane0 and Lane1 rates — 1310 |
| 44 | Lane2 and Lane3 rates — 1320 |
| 45 | Lane4 and Lane5 rates — 1330 |
| 46 | Lane6 and Lane7 rates — 1340 |
| 47-1496 | Pad/Reserved — 1350 |

| Octet | Field | Description | |
|---|---|---|---|
| 1-2 | ONU-ID | Directed message to one ONU or broadcast message to all ONUs. As a broadcast to all ONUs, ONU-ID = 0x03FF. | |
| 3 | Message type ID | Message type ID of OLT lane announcement and/or ONU lane report | |
| 4 | SeqNo | Sequence number. | |
| 5 | Lane amount | | ── 1405 |
| 6 | Lane group amount | | ── 1410 |
| 7 | Lane0 and Lane1 rates | | ── 1415 |
| 8 | Lane2 and Lane3 rates | | ── 1420 |
| 9 | Lane4 and Lane5 rates | | ── 1425 |
| 10 | Lane6 and Lane7 rates | | ── 1430 |
| 11 | LaneGroup0 | Amount of lanes in LaneGroup0 | ── 1435 |
| 12 | LaneGroup0 member | 0xHGFE DCBA | ── 1440 |
| 13 | LaneGroup1 | | ── 1445 |
| 14 | LaneGroup1 member | 0xHGFE DCBA | ── 1450 |
| 15 | LaneGroup2 | | ── 1455 |
| 16 | LaneGroup2 member | 0xHGFE DCBA | ── 1460 |
| | LaneGroupK | | ── 1465 |
| | LaneGroupK member | 0xHGFE DCBA | ── 1470 |
| ... | Pad | | |
| 41-48 | MIC | Message integrity check. | |

| Octet | Use |
|---|---|
| 1..2 | Transaction correlation identifier. |
| 3 | Message type: ONU lane report |
| 4 | Device identifier |
| 5..8 | Managed entity identifier |
| 9..10 | Message contents length |
| 11 | ONU lane amount — 1510 |
| 12 | Rate: Lane0, Lane1 — 1520 |
| 13 | Rate: Lane2, Lane3 — 1530 |
| ... | ... |
| (N-3)..N | Message integrity check (MIC) |

| | Octets |
|---|---|
| Destination Address | 6 |
| Source Address | 6 |
| Length/Type = 0x8808 | 2 |
| Opcode = 0x0005 | 2 |
| Timestamp | 4 |
| Assigned port | 2 |
| Flags | 1 |
| Sync Time | 2 |
| Echoed pending grants | 1 |
| Target Laser On Time | 1 |
| Target Laser Off Time | 1 |
| Pad/Reserved | 32 |
| FCS | 4 |

| LSB | | | | | | MSB |
|---|---|---|---|---|---|---| b0                  b7

←BITS WITHIN FRAME→
TRANSMITTED LEFT TO RIGHT

| Pad octet extension | Description | Values | |
|---|---|---|---|
| 1 | ONU lane assignment | 0:disable the ONU lane assignment function; 1:enable the ONU lane assignment function; Other values are reserved | — 1700 |
| 1 | ONU LaneGroupID | LaneGroup ID this ONU should work on | — 1710 |
| 1 | LaneGroup member | Lane members in LaneGroup ID | — 1720 |
| 1 | Lane0 and Lane1 rates | Setup the rate for Lane0 and Lane1, rate is 0 if a lane is not assigned to this ONU | — 1730 |
| 1 | Lane2 and Lane3 rates | Setup the rate for Lane2 and Lane3 | — 1740 |
|  |  | ... | — 1750 |
| K-M | Pad/Reserved |  | — 1760 |

FIG. 17

LANE BONDING IN PASSIVE OPTICAL NETWORKS (PONS)

CROSS-REFERENCE TO RELATED APPLICATIONS

This is a continuation of U.S. patent application Ser. No. 15/433,822 filed on Feb. 15, 2017 by Futurewei Technologies, Inc. and titled "Lane Bonding in Passive Optical Networks (PONs)," which claims priority to U.S. provisional patent application no. 62/296,924 filed on Feb. 18, 2016 by Futurewei Technologies, Inc. and titled "Multi-Lane Bonding in a Passive Optical Network (PON)," both of which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. In other words, different wavelengths may be multiplexed together to share a single feeder fiber, and each wavelength may be shared by multiple users using TDM.

SUMMARY

According to various embodiments of the present disclosure, embodiments for lane bonding in PONs are disclosed. In this context, lane bonding refers to an OLT assigning multiple lanes to an ONU to use at the same time and refers to an ONU using multiple lanes at the same time. The lanes may also be referred to as channels. Each lane corresponds to a different wavelength, 64 B/66 B block, Ethernet packet, FEC codeword, or other divisible data-carrying vehicle. A lane group is a bonded set of lanes associated with a single ONU. PONS may support ONUs with different lane bonding capabilities. Lane bonding may provide higher data rates compared to single-lane data rates and may provide variable data rates for ONUs In one embodiment, the disclosure includes an apparatus comprising: a processor configured to: determine a set of first lanes associated with a PON; select a subset of second lanes from the set; and perform lane bonding by bonding the subset to an ONU; and a transmitter coupled to the processor and configured to transmit a lane bonding assignment to the ONU. In some embodiments, the first lanes correspond to wavelengths; in some embodiments the first lanes correspond to one of 64 B/66 B blocks, Ethernet packets, or FEC codewords; the processor is further configured to generate a first message comprising an announcement indicating rate-based windows and an OLT lane capability, and wherein the transmitter is further configured to transmit the first message to the ONU; the method further comprises a receiver coupled to the processor and configured to receive a second message from the ONU in response to the first message, wherein the second message comprises a report indicating an ONU lane capability; the processor is further configured to further perform the lane bonding in response to the second message, and wherein the transmitter is further configured to transmit the lane bonding assignment in response to the second message; the receiver is further configured to receive a third message from the ONU in response to the lane bonding assignment, wherein the third message confirms the lane bonding assignment; wherein the apparatus is an OLT.

In another embodiment, the disclosure includes a method comprising: generating a first discovery gate message comprising an OLT lane capability; transmitting the first discovery gate message to a first ONU in a PON; receiving a first register request message from the first ONU in response to the first discovery gate message, wherein the first register request message comprises a first ONU lane capability; processing the first register request message; generating a first register message in response to the processing, wherein the first register message comprises a first assignment of first lanes to the first ONU; and transmitting the first register message to the first ONU. In some embodiments, the method further comprises: generating a first gate message; transmitting the first gate message to the first ONU; receiving a first register acknowledgment message from the first ONU in response to the first gate message; and processing the first register acknowledgment message; the method further comprises: generating a second discovery gate message comprising the OLT lane capability; transmitting the second discovery gate message to a second ONU in the PON; receiving a second register request message from the second ONU in response to the second d discovery gate message, wherein the second register request message comprises a second ONU lane capability; processing the second register request message; generating a second register message in response to the processing the second register request message, wherein the second register message comprises a second assignment of second lanes to the second ONU; and transmitting the second register message to the second ONU; in some embodiments the first lanes correspond to wavelengths; in some embodiments the first lanes correspond to one of 64 B/66 B blocks, Ethernet packets, or FEC codewords; the first discovery gate message further comprises rate-based windows; the method further comprises generating the first discovery gate message when the ONU registers with the PON.

In yet another embodiment, the disclosure includes an ONU comprising: a plurality of receivers configured to receive a first message comprising an announcement indicating an OLT lane capability; a processor coupled to the receivers and configured to: process the first message; and generate a second message in response to the first message, wherein the second message comprises a report indicating an ONU lane capability and prompting lane bonding in a PON; and a plurality of transmitters coupled to the processor and configured to transmit the second message to the OLT. In some embodiments, the receivers are further configured to receive a third message in response to the second message, wherein the third message comprises an assignment of a first set of lanes to the ONU; the processor is further configured to generate a fourth message in response to the third message, wherein the fourth message confirms the assignment, and wherein the transmitters are further configured to transmit the fourth message to the OLT; the processor is further configured to instruct enablement, disablement, or both enablement and disablement of at least one of the receivers and at least one of the transmitters based on the third message; the processor is further configured to generate a fourth message requesting an updated assignment of a second set of lanes to the ONU, and wherein the transmitters are configured to transmit the fourth message to the OLT.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table describing an MPCP discovery gate message.

FIG. 5 is an expanded discovery information field for the MPCP discovery gate message described in FIG. 4 according to an embodiment of the disclosure.

FIG. 6 is an expanded pad/reserve field for the MPCP discovery gate message described in FIG. 4 according to an embodiment of the disclosure.

FIG. 7 is a table describing an MPCP register request message.

FIG. 8 is an expanded discovery information field for the MPCP register request message described in FIG. 7 according to an embodiment of the disclosure.

FIG. 9 is an expanded pad/reserve field for the MPCP register request message described in FIG. 7 according to an embodiment of the disclosure.

FIG. 10 is a table describing an MPCP discovery gate message according to an embodiment of the disclosure.

FIG. 11 is a table describing an MPCP register request message according to an embodiment of the disclosure.

FIG. 13 is an expanded data/pad field for the OAM message described in FIG. 12 according to an embodiment of the disclosure.

FIG. 14 is a table describing a PLOAM lane group announcement message according to an embodiment of the disclosure.

FIG. 16 is a table describing an MPCP register message.

FIG. 17 is an expanded pad/reserved field for the MPCP register message described in FIG. 16 according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
CO: central office
CPU: central processing unit
DA: destination address
demux: demultiplexer
DSP: digital signal processor
EO: electrical-to-optical
FEC: forward error correction
FPGA: field-programmable gate array
G: gigabits per second
ID: identifier
IEEE: Institute of Electrical and Electronics Engineers
ITU-T: International Telecommunication Union Telecommunication Standardization Sector
LLID: logical link identifier
MAC: media access control
MPCP: multipoint MAC control protocol
mux: multiplexer
NG-PON: next-generation PON
NG-PON2: next-generation PON 2
OAM: operations, administration, and maintenance
ODN: optical distribution network
OE: optical-to-electrical
OLT: optical line terminal
OMCI: ONU management and control interface
ONT: optical network terminal
ONU: optical network unit
PCS: physical coding sublayer
PLOAM: physical layer OAM
PMA: physical medium attachment
PMD: physical medium dependent
PON: passive optical network
P2MP: point-to-multipoint
RAM: random-access memory
RN: remote node
ROM: read-only memory
RS: reconciliation sublayer
RX: receiver unit
SA: source address
SRAM: static RAM
TCAM: ternary content-addressable memory
TDM: time-division multiplexing
TWDM: time- and wavelength-division multiplexing
TX: transmitter unit
WDM: wavelength-division multiplexing 100 G-EPON: 100 G Ethernet PON 64 B/66 B: 64-bit to 66-bit.

Figure 1:
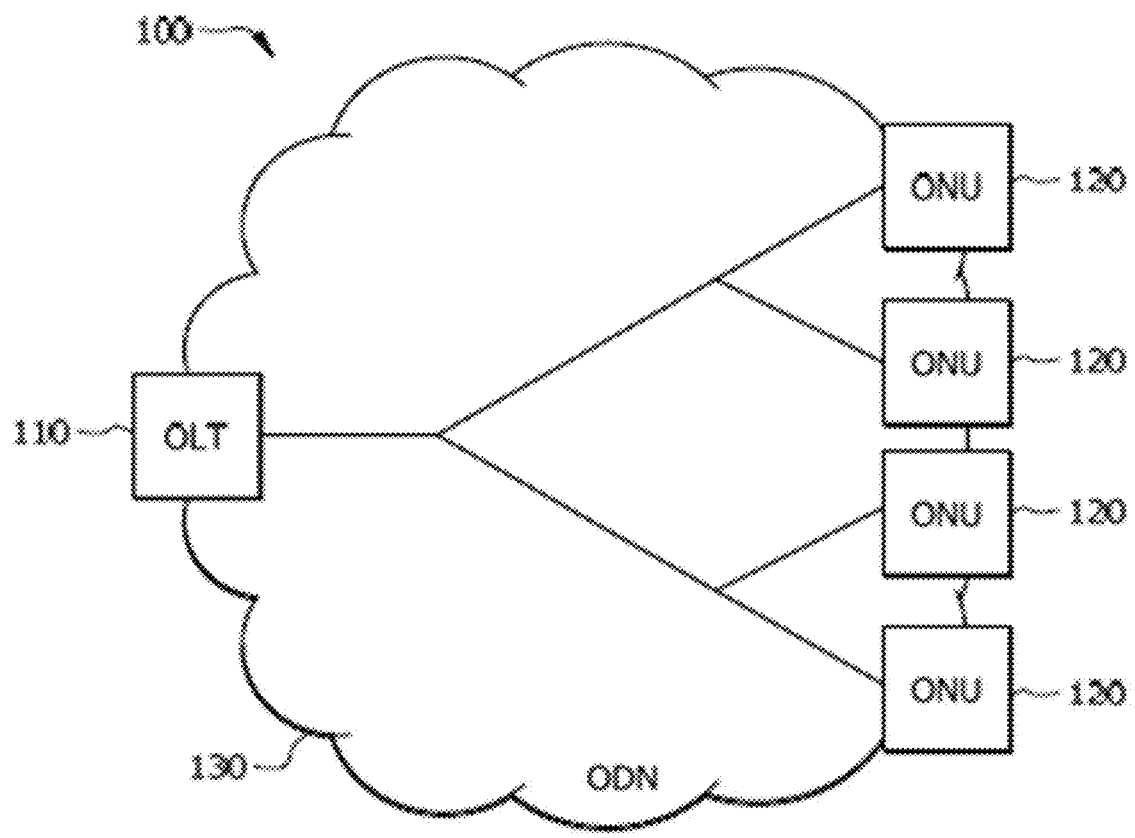
FIG. 1 is a schematic diagram of a PON.

FIG. 1 is a schematic diagram of a PON 100. The PON 100 comprises an OLT 110, a plurality of ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

Customers are demanding higher data rates for streaming high-definition videos and for other applications. However, traditional PONs may not be able to provide those data rates or provide variable data rates. There is therefore a need to provide PONs with higher data rates and variable data rates.

Disclosed herein are embodiments for lane bonding in PONs. In this context, lane bonding refers to an OLT assigning multiple lanes to an ONU to use at the same time and refers to an ONU using multiple lanes at the same time. The lanes may also be referred to as channels. Each lane corresponds to a different wavelength, 64 B/66 B block, Ethernet packet, FEC codeword, or other divisible data-carrying vehicle. A lane group is a bonded set of lanes associated with a single ONU. PONs may support ONUs with different lane bonding capabilities. Lane bonding may provide higher data rates compared to single-lane data rates and may provide variable data rates for ONUs.

Figure 2:
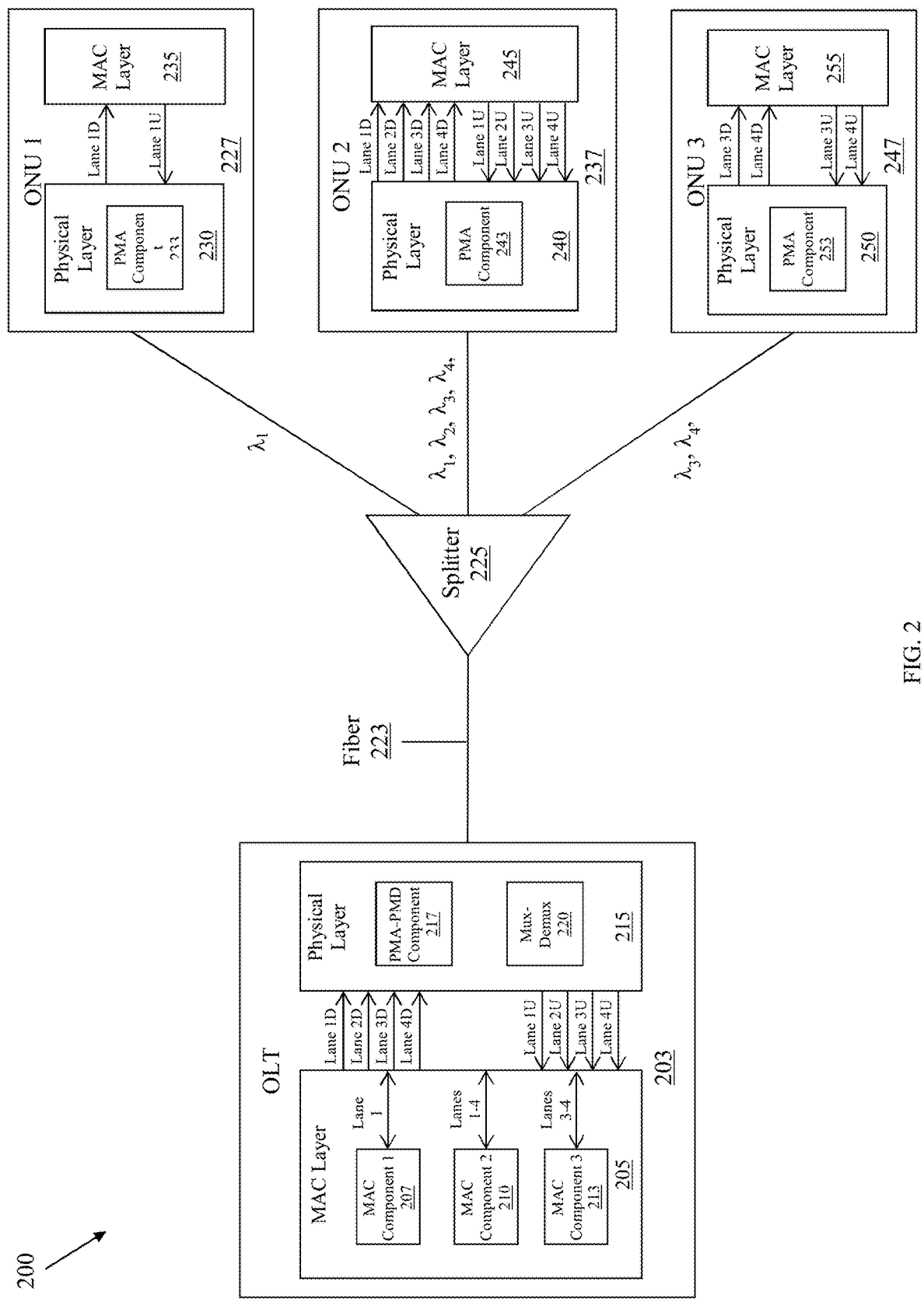
FIG. 2 is a schematic diagram of a TWDM PON according to an embodiment of the disclosure.

FIG. 2 is a schematic diagram of a TWDM PON 200 according to an embodiment of the disclosure. The TWDM PON 200 is similar to the PON 100. Like the PON 100, the TWDM PON 200 comprises an OLT 203 and ONUs 227, 237, 247. However, unlike the PON 100, the TWDM PON 200 explicitly labels a fiber 223, the TWDM PON 200 explicitly shows a splitter 225, and the OLT 203 and the ONUs 227, 237, 247 explicitly show additional detail as described below.

The OLT 203 comprises a MAC layer 205 and a physical layer 215. The MAC layer 205 comprises MAC components 207, 210, 213, which perform MAC processing as described in IEEE 802.3-20012, Section Five, 2012 ("802.3"), which is incorporated by reference. The MAC components 207, 210, 213 are virtual MAC components and correspond with the ONUs 227, 237, 247, respectively. The physical layer 215 comprises a PMA-PMD component 217 and a mux-demux 220. The PMA-PMD component 217 performs PMA and PMD functions as described in 802.3. The mux-demux 220 multiplexes multiple signals from the MAC components 207, 210, 213 into single downstream signals for transmission towards the splitter 225, and the mux-demux 220 demultiplexes a single upstream signal from the splitter 225 into multiple signals for passing towards the MAC components 207, 210, 213.

The ONUs 227, 237, 247 comprise physical layers 230, 240, 250 and MAC layers 235, 245, 255, respectively. The physical layers 230, 240, 250 comprise PMA-PMD components 233, 243, 253, respectively. The PMA-PMD components 233, 243, 253 perform PMA and PMD functions as described in 802.3 The physical layers 230, 240, 250 may further comprise physical interfaces with transmitters and receivers to support various wavelengths. The MAC layers 235, 245, 255 perform MAC functions as described in 802.3.

In operation, the TWDM PON 200 performs TWDM and lane bonding. To perform TWDM, the TWDM PON 200 performs at least three functions. First, in the OLT 203, the mux-demux 220 multiplexes multiple signals from the MAC components 207, 210, 213. The signals are at different wavelengths denoted as $\lambda_1, \lambda_2, \lambda_3, \lambda_4$. The mux-demux 220 multiplexes those signals into a single downstream signal comprising all four wavelengths $\lambda_1, \lambda_2, \lambda_3, \lambda_4$, and the OLT transmits the downstream signal to the ONUs 227, 237, 247. Second, the ONUs 227, 237, 247 transmit upstream signals in bursts at different times. Some of the upstream signals may be at different wavelengths, and some of the upstream signals may be at the same wavelength. Third, the splitter 225 multiplexes those upstream signals into a single upstream signal and passes the single upstream signal to the OLT 203.

In the TWDM PON 200, ONU 1 227 uses one lane, lane 1, which communicates at a wavelength $\lambda_1$; ONU 2 237 uses four lanes, lanes 1-4, which communicate at wavelengths $\lambda_1$-$\lambda_4$; and ONU 3 247 uses two lanes, lanes 3-4, which communicate at wavelengths $\lambda_3$-$\lambda_4$. Lane 1 has both a downstream component denoted as lane 1D and an upstream component denotes as 1 U, and lanes 2-4 have similar denotations. If each lane provides a data rate of 25 G, then ONU 1 227 has a data rate of 25 G, ONU 2 237 has a data rate of 100 G, and ONU 3 247 has a data rate of 50 G. In other words, lane bonding four different lanes transforms the TWDM PON 200 from a 25 G PON to a 100 G PON.

Alternatively, the ONUs 227, 237, 247 use any suitable combination of the four lanes. Though only four wavelengths are shown, the TWDM PON 200 may employ any suitable number of wavelengths and thus lanes. Also, though the lanes described above are based on wavelengths, the lanes may also be based on 64 B/66 B blocks associated with different PCS layers, Ethernet packets associated with different RS layers, FEC codewords, or other divisible data-carrying vehicles. Any suitable PON may employ the disclosed lane bonding.

Figure 3:
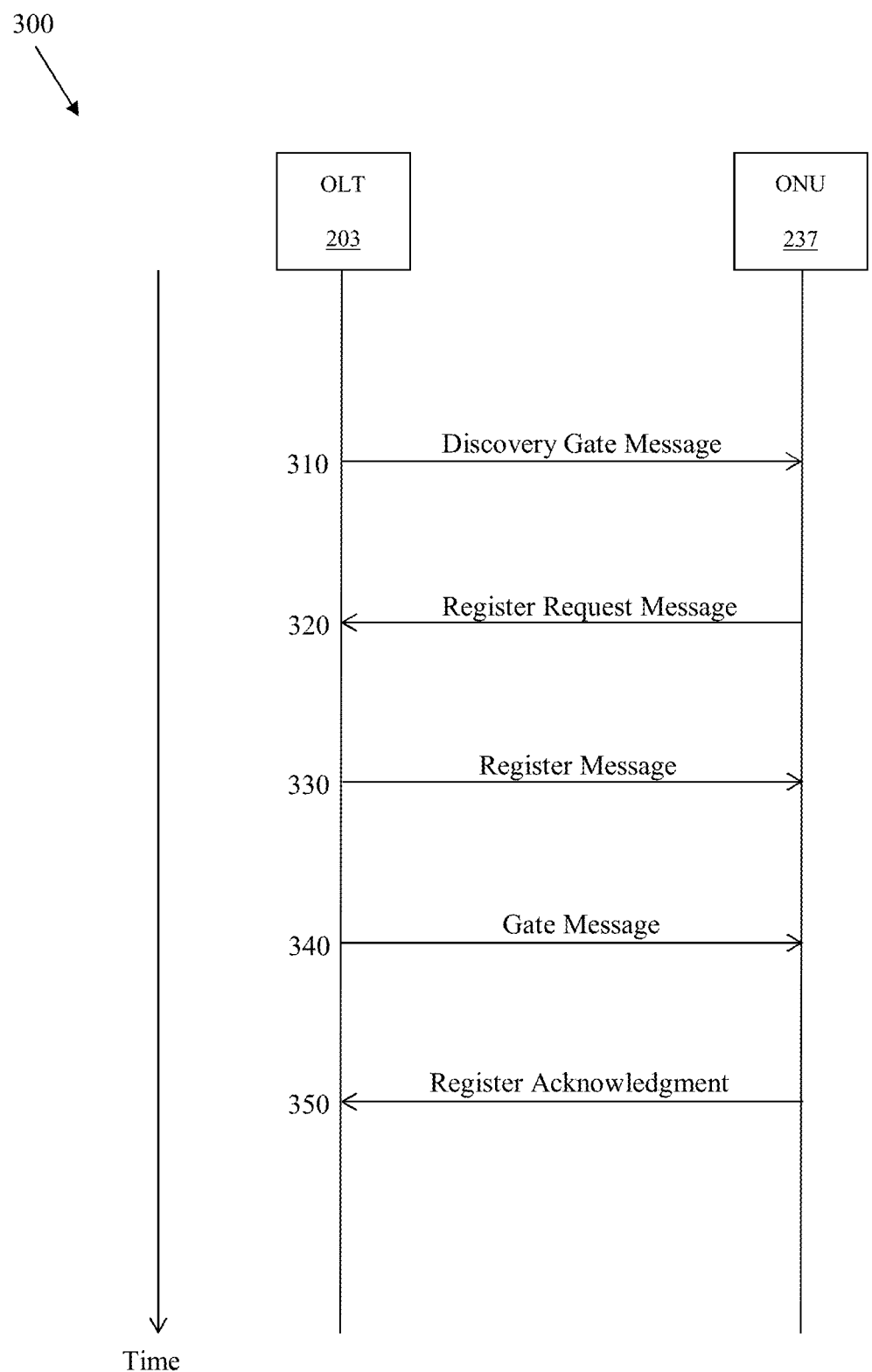
FIG. 3 is a message sequence diagram illustrating lane bonding according to an embodiment of the disclosure.

FIG. 3 is a message sequence diagram 300 illustrating lane bonding according to an embodiment of the disclosure. The message sequence diagram 300 occurs when the ONU 237 turns on, when the ONU 237 registers with or joins the TWDM PON 200, when the ONU 237 desires a data rate change, or at other suitable times. Though the ONU 237 is discussed, similar principles apply to the ONUs 227, 247.

At step 310, the OLT transmits an MPCP discovery gate message to the ONU 237. The MPCP discovery gate message comprises a DA indicating a broadcasting address to all of the ONUs 227, 237, 247; an SA indicating a MAC address of the OLT 203; and content indicating a grant, a sync time, and discovery information. The MPCP discovery gate message further comprises an announcement indicating rate-based windows, an OLT lane amount indicating how many lanes the OLT 203 supports, an OLT lane rate indicating the data rate that the OLT 203 supports for the lanes, and lane groups indicating the lanes belonging to each lane group. The OLT lane amount, OLT lane rate, and lane groups make up OLT lane capability of the OLT 203. The announcement indicates rate-based windows by indicating, for instance, that window 1 is for 25 G registration, window 2 is for 50 G registration, and so on. The data rate is, for instance, 25 G.

At step 320, the ONU 237 transmits an MPCP register request message to the OLT 203. The MPCP register request message is transmitted during a discovery window and comprises a DA indicating the MAC address of the OLT 203; an SA indicating a MAC address of the ONU 237; and content indicating pending grants, discovery information, a laser on time, and a laser off time. The MPCP register request message further comprises an ONU lane amount indicating the number of lanes that the ONU 237 supports and comprises lane rate information indicating the data rate that the ONU 237 supports. The ONU lane amount and lane rate information make up ONU lane capability for the ONU 237. For wavelength lane bonding, the number of lanes is equal to the number of transmitters that the ONU 237 comprises, and the data rate is the data rate that the transmitters support.

At step 330, the OLT 203 transmits an MPCP register message to the ONU 237. The MPCP register message comprises a DA indicating the MAC address of the ONU 237; an SA indicating the MAC address of the OLT 203; and content indicating an LLID, a synchronization time, an echo of pending grants, a target laser on time, and a target laser off time. The MPCP register message further comprises a lane group assignment indicating which lanes the ONU 237 may use. For instance, the lane group assignment indicates that the ONU 237 may use lanes 1-4. If the ONU 237 is using less than four transmitters and receivers, then the lane group assignment instructs the ONU 237 to enable or turn on additional transmitters and receivers. If the ONU 237 is using more than four transmitters and receivers, then the lane group assignment instructs the ONU 237 to disable or turn off excess transmitters and receivers.

At step 340, the ONU 237 transmits an MPCP gate message to the OLT 203. The MPCP gate message comprises a DA indicating the MAC address of the ONU 237, an SA indicating the MAC address of the OLT 203, and content indicating a grant.

Finally, at step 350, the ONU 237 transmits an MPCP register acknowledgment to the OLT 203. The MPCP register acknowledgment comprises a DA indicating the MAC address of the OLT 203, an SA indicating the MAC address of the ONU 237, and content indicating an echo of the LLID and an echo of the synchronization time. The MPCP register acknowledgment further comprises confirmation of lane group assignment. The confirmation may be a mere confirmation or may comprise an echo of the lane group assignment in the MPCP register message. After completing step 350, a discovery handshake with lane bonding between the OLT 203 and the ONU 237 is complete.

The message sequence diagram 300 uses MPCP messaging for 100 G-EPON as described in 802.3. Similar messaging may implement lane bonding using extended MPCP messaging; OAM messaging for 100 G-EPON as described in 802.3; PLOAM messaging for NG-PON2 as described in ITU-T G.989.3, October 2015 ("G.989.3"); OMCI messaging for NG-PON2 as described in G.989.3; or other suitable messaging. Thus, extended or new MPCP, OAM, PLOAM, OMCI, or other messages implement lane bonding by the OLT 203 announcing lane groups to the ONU 237, the ONU 237 reporting its lane capabilities to the OLT 203, and the OLT 203 assigning any number of lanes to the ONU 237. The messages comprise fields in the form of bitmap, code point, or other suitable formats. In some embodiments, the messages may not be divided into parts, but are instead communicated as non-divided elements.

Alternatively, the ONU 237 requests new lane bonding or alteration of current lane bonding. The ONU does so in response to downloading or uploading requirements, network conditions, or other factors. For instance, the ONU 237 determines its current download rate capacity, determines a required download rate for its current tasks, compares the current download rate capacity to the required download rate, determines whether more or less download rate capacity is needed, and messages the OLT 203 for an increased or decreased data rate and thus new lane bonding or alteration of current lane bonding. For instance, a user of the ONU 237 is surfing the Internet, downloading minimal data, and using one lane. The user then begins streaming a high-definition movie, which requires downloading significantly more data. The ONU 237 therefore messages the OLT 203 to indicate an increased data rate. In response, the OLT 203 establishes lane bonding by providing the ONU 237 with three new lanes. When the movie ends, the ONU 237 messages the OLT 203 to indicate a decreased data rate. The OLT 203 terminates lane bonding, and the ONU 237 returns to using one lane.

Figure 15:
FIG. 15 is a table describing an OMCI lane capability report message according to an embodiment of the disclosure.
Figure 18:
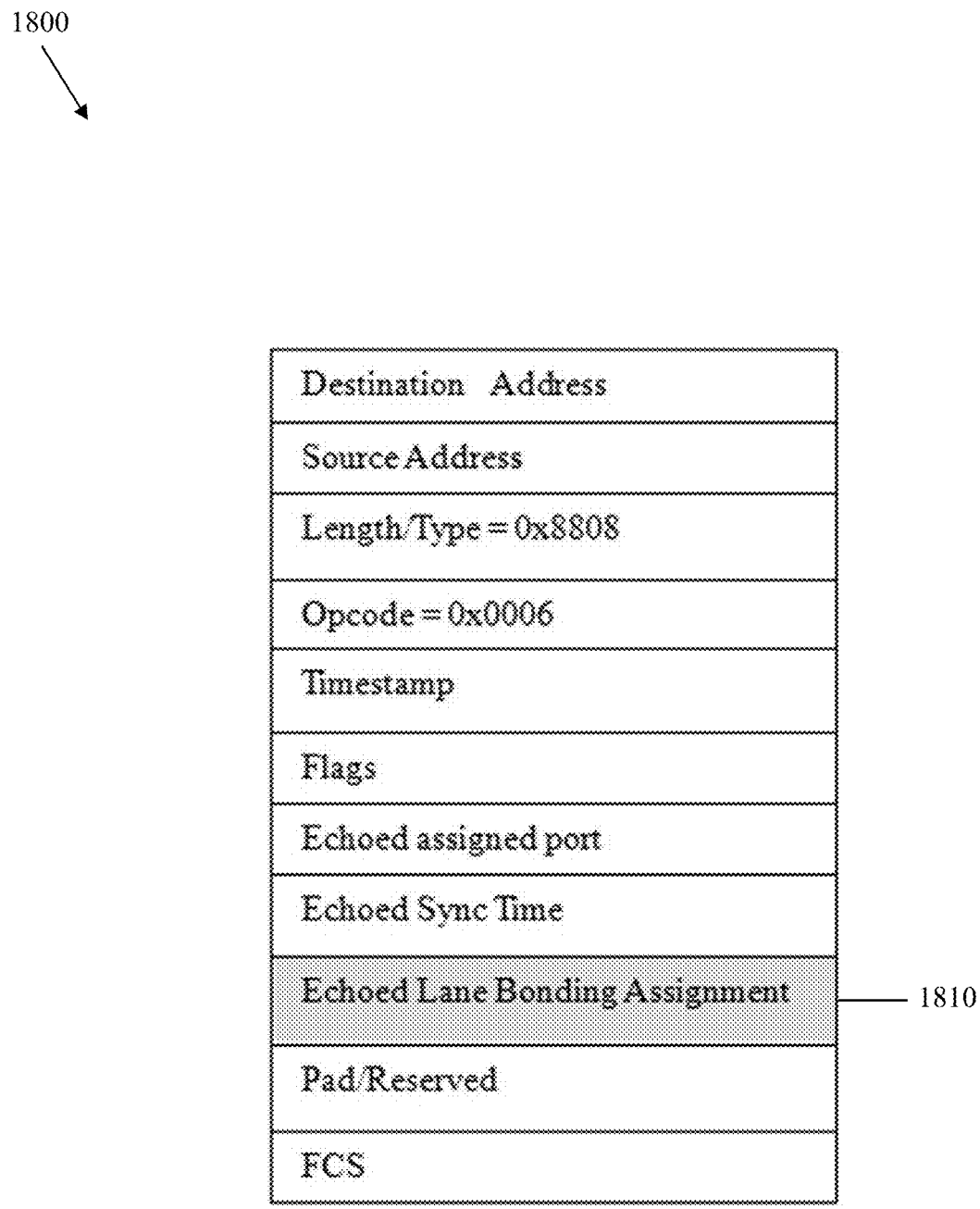
FIG. 18 is a table describing an MPCP register acknowledgment message according to an embodiment of the disclosure.

The figures below provide examples of such lane bonding. Specifically, FIGS. 4-13 implement lane group announcement and lane capability reporting for 802.3, where FIGS. 4-9 extend existing messages and FIGS. 10-13 use new messages. FIGS. 14-15 implement lane group announcement and lane capability reporting for G.989.3 using new messages. FIGS. 16-18 implement lane bonding assignment for 802.3, where FIGS. 16-17 extend an existing message and FIG. 18 uses a new message.

FIG. 4 is a table 400 describing an MPCP discovery gate message. The MPCP discovery gate message may implement the MPCP discovery gate message in step 310 of FIG. 3. The table 400 comprises various fields, including a discovery information field 410 and a pad/reserved field 420, which are described in 802.3. The discovery information field 410 may be expanded to create an expanded discovery information field as shown in FIG. 5, and the pad/reserved field 420 may be expanded to create an expanded pad/reserved field 420 as shown in FIG. 6.

FIG. 5 is an expanded discovery information field 410 for the MPCP discovery gate message described in FIG. 4 according to an embodiment of the disclosure. The expanded discovery information field 410 comprises various fields, which are also described in 802.3. Describing the remaining fields by their bit positions, the expanded discovery information field 410 further comprises second through third and twelfth through fifteenth flag fields indicating whether the OLT 203 supports reception of 25 G, 50 G, 100 G, N, M, and L data rates, respectively; as well as sixth through eleventh flag fields indicating whether the OLT 203 will accept 25 G, 50 G, 100 G, N, M, and L data rates during a window when the ONUs 227, 237, 247 receive the MPCP discovery gate message. The window may support a single data rate, a subset of data rates, or all data rates. N, M, and L are any suitable positive integers.

FIG. 6 is an expanded pad/reserve field 420 for the MPCP discovery gate message described in FIG. 4 according to an embodiment of the disclosure. Describing the fields by their positions in the expanded pad/reserve field 420, the expanded pad/reserve field 420 comprises a first OLT lane amount field indicating how many lanes the OLT 203 supports; a second OLT lane group amount field indicating how many groups the OLT 203 supports; third through sixth lane rate fields indicating data rates for groups 0-1, 2-3, 4-5, 6-7, respectively; seventh through twenty-second fields, which alternate between lane group fields indicating a number of total lanes for each group and lane group member fields indicating which lanes belong to each group; and a twenty-third pad/reserved field, which is ignored on reception.

FIG. 7 is a table 700 describing a MPCP register request message. The MPCP register request message may implement the MPCP register request message in step 320 of FIG. 3. The table 700 comprises various fields, including a discovery information field 710 and a pad/reserved field 720, which are described in 802.3. The discovery information field 710 may be expanded to create an expanded discovery information field 710 as shown in FIG. 8, and the pad/reserved field 720 may be expanded to create an expanded pad/reserved field 720 as shown in FIG. 9.

FIG. 8 is an expanded discovery information field 710 for the MPCP register request message described in FIG. 7 according to an embodiment of the disclosure. The expanded discovery information field 710 comprises various fields, which are also described in 802.3. Describing the remaining fields by their bit positions, the expanded discovery information field 710 further comprises second through third and twelfth through fifteenth flag fields indicating whether the ONU 237 is capable of 25 G, 50 G, 100 G, N, M, and L data rates, respectively, as well as sixth through eleventh flag fields indicating a desire to register for 25 G, 50 G, 100 G, N, M, and L data rates, respectively.

FIG. 9 is an expanded pad/reserve field 720 for the MPCP register request message described in FIG. 7 according to an embodiment of the disclosure. Describing the fields by their positions in the expanded pad/reserve field 720, the expanded pad/reserve field 720 comprises a first ONU lane amount field indicating how many lanes the ONU 237 supports; second through fifth lane rate fields indicating data rates for lanes 0-1, 2-3, 4-5, 6-7, respectively; and a sixth pad/reserved field, which is ignored on reception.

FIG. 10 is a table 1000 describing an MPCP discovery gate message according to an embodiment of the disclosure. The MPCP discovery gate message may implement the discovery gate message in step 310 of FIG. 3. The table 1000 comprises various fields, which are described in 802.3. The table 1000 further comprises a fifteenth ONU lane report field 1010 indicating whether the ONU 237 should report its lane information. A first logical bit value, for instance 0, indicates that no response is required. A second logical bit value, for instance 1, commands the ONU 237 to report its lane information.

FIG. 11 is a table 1100 describing an MPCP message according to an embodiment of the disclosure. The ONU 237 transmits the MPCP message to the OLT 203 after the ONU 237 transmits the MPCP register request message in step 320 of FIG. 3. If the OLT 203 includes a lane bonding assignment in the register message in step 330 of FIG. 3, then the ONU 237 transmits the MPCP message before the OLT 203 transmits the register message. If the OLT 203 includes the lane bonding assignment in a message not shown in FIG. 3, then the ONU 237 transmits the MPCP message after the OLT 203 transmits the register message. The table 1100 comprises various fields, which are described in 802.3. Describing the remaining fields by their positions in the MPCP register request message 1100, the table 1100 further comprises a sixth ONU lane amount field 1110 indicating how many lanes the ONU 237 supports and seventh through tenth lane rate fields 1120-1150 indicating data rates for lanes 0-1, 2-3, 4-5, 6-7, respectively.

Figure 12:
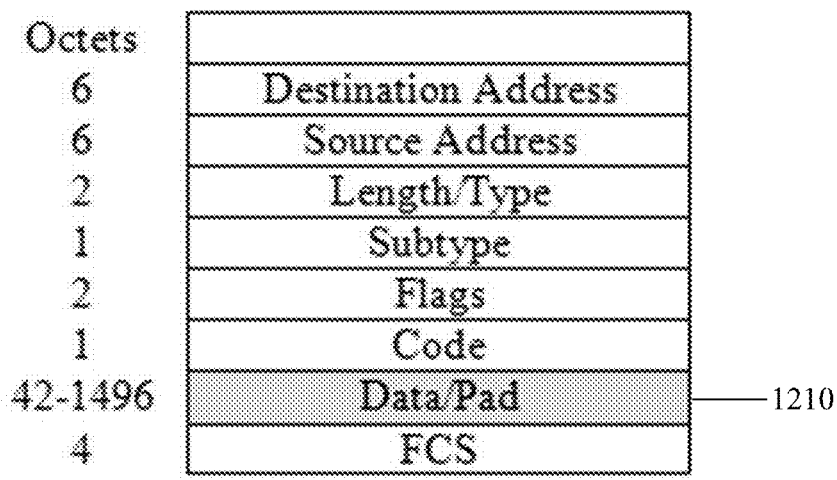
FIG. 12 is a table describing an OAM message.

FIG. 12 is a table 1200 describing an OAM message. The OAM message may implement messages similar to the messages in FIG. 3. The table 1200 comprises various fields, including a data/pad field 1210, which are described in 802.3. The data/pad field 1210 may be expanded to create an expanded data/pad field 1210 as shown in FIG. 13.

FIG. 13 is an expanded data/pad field 1210 for the OAM message described in FIG. 12 according to an embodiment of the disclosure. By including the expanded data/pad field 1210, the OAM message may implement a message similar to the MPCP register request message in step 320 of FIG. 3. The expanded data/pad field 1210 comprises a pad/reserved field 1350, which is also described in 802.3. Describing the remaining fields by their octet positions, the expanded data/pad field 1210 further comprises a forty-second octet comprising an ONU lane amount field 1300 indicating how many lanes the ONU 237 supports and forty-third through forty-sixth fields 1310-1340 indicating data rates for lanes 0-1, 2-3, 4-5, and 6-7, respectively.

FIG. 14 is a table 1400 describing a PLOAM lane group announcement message according to an embodiment of the disclosure. The PLOAM lane group announcement message implements a message similar to the MPCP discovery gate message in step 310 of FIG. 3. The table 1400 comprises various fields, which are described in G.989.3. Describing the remaining fields by their octet positions, the table 1400 further comprises a fifth octet comprising a lane amount field 1405 indicating how many lanes the OLT 203 supports; a sixth octet comprising a lane group amount field 1410 indicating how many groups the OLT 203 supports; seventh through tenth octets comprising lane rate fields 1415-1430 indicating data rates for groups 0-1, 2-3, 4-5, 6-7, respectively; and eleventh through sixteenth octets and beyond, which alternate between lane group fields 1435, 1445, 1455, 1465 indicating a number of total lanes for each group and lane group member fields 1440, 1450, 1460, 1470 indicating which lanes belong to each group.

FIG. 15 is a table 1500 describing an OMCI lane capability report message according to an embodiment of the disclosure. The OMCI lane capability report message implements a message similar to the MPCP register request message in step 320 of FIG. 3. The table 1500 comprises various fields, which are described in G.989.3. Describing the remaining fields by their octet positions, the table 1500 further comprises an eleventh octet comprising an ONU lane amount field 1510 indicating how many lanes the ONU 237 supports and twelfth through thirteenth octets 1520-1530 comprising lane rate fields indicating data rates for lanes 0-1 and 2-3, respectively.

FIG. 16 is a table 1600 describing an MPCP register message. The MPCP register message may implement the MPCP register message in step 330 of FIG. 3. The table 1600 comprises various fields, including a pad/reserved field 1610, which are described in 802.3. The pad/reserved 1610 field may be expanded to create an expanded pad/reserved field 1610 as shown in FIG. 17.

FIG. 17 is an expanded pad/reserved field 1610 for the MPCP register message described in FIG. 16 according to an embodiment of the disclosure. Describing the fields by their positions in the expanded pad/reserve field 1610, the expanded pad/reserve field 1610 comprises a first ONU lane assignment field 1700 indicating whether the OLT 203 has activated lane assignment; a second ONU lane group ID field 1710 indicating an ID for a lane group that the OLT 203 assigns to the ONU 237; a third lane group member field 1720 indicating which lanes belong to the lane group that the OLT 203 assigns to the ONU 237; fourth, fifth, and additional lane rate fields 1730-1750 indicating the data rates for lanes 0-1, lanes 2-3, and additional lanes, respectively, that the ONU 237 should operate on; and a last pad/reserved field 1760. In response to receiving the MPCP register message, the ONU 237 turns on its receivers and transmitters corresponding to the lanes indicated in the lane group member field 1720, turns off its other receivers and transmitters, and transmits a register acknowledgment message.

FIG. 18 is table 1800 describing an MPCP register acknowledgment message according to an embodiment of the disclosure. The MPCP register acknowledgment message may implement the MPCP register acknowledgment message in step 350 of FIG. 3. The table 1800 comprises various fields, which are described in 802.3. The table 1800 further comprises an echoed lane bonding assignment field 1810 comprising an echo of the lane group assignment in the expanded pad/reserved field 1610.

Figure 19:
FIG. 19 is a lane assignment table according to an embodiment of the disclosure.

FIG. 19 is a lane assignment table 1900 according to an embodiment of the disclosure. The lane assignment table 1900 comprises, for each of a plurality of ONUs, a first column indicating an ONU ID, a second column indicating a number of enabled upstream lanes, a third column indicating OLT receiver lane IDs, a fourth column indicating an OLT upstream group ID, a fifth column indicating each enabled lane, a sixth column indicating wavelength IDs for each enabled upstream lane; a seventh column indicating a number of enabled downstream lanes, an eighth column indicating ONU receiver lane IDs, a ninth column indicating an ONU downstream group ID, and a tenth column indicating wavelength IDs for each enabled downstream lane. An OLT creates the lane assignment table 1900 upon initiation or at other suitable times; maintains the lane assignment table 1900; and updates the lane assignment table 1900 when the ONUs register with the TWDM PON 200, when the ONUs change their lane assignments, or at other suitable times. When the ONUs change their lanes, they transmit new lane reports to the OLT. The new lane reports are extended or new messages.

Handshake operation refers to a period corresponding to the message sequence diagram 300 in FIG. 3 in which an ONU registers with an OLT. In contrast, regular operation refers to all other periods in which ONUs communicate user data with the OLT. During regular operation, the OLT may communicate with the ONUs using only the respective lanes of the ONUs. Doing so precludes the need to communicate using other lanes. For example, per the lane assignment table 1900, the OLT communicates with ONU 1 using only lane 0 and communicates with ONU 4 using only lanes 1 and 2. The OLT does not communicate with ONU 1 using lanes 1-4 or with ONU 4 using lanes 0 or 3-4. In addition, if each lane represents a different wavelength, then the OLT may communicate with ONU 1 and ONU 4 at the same time. Thus, the lane bonding improves efficiency.

Figure 20:
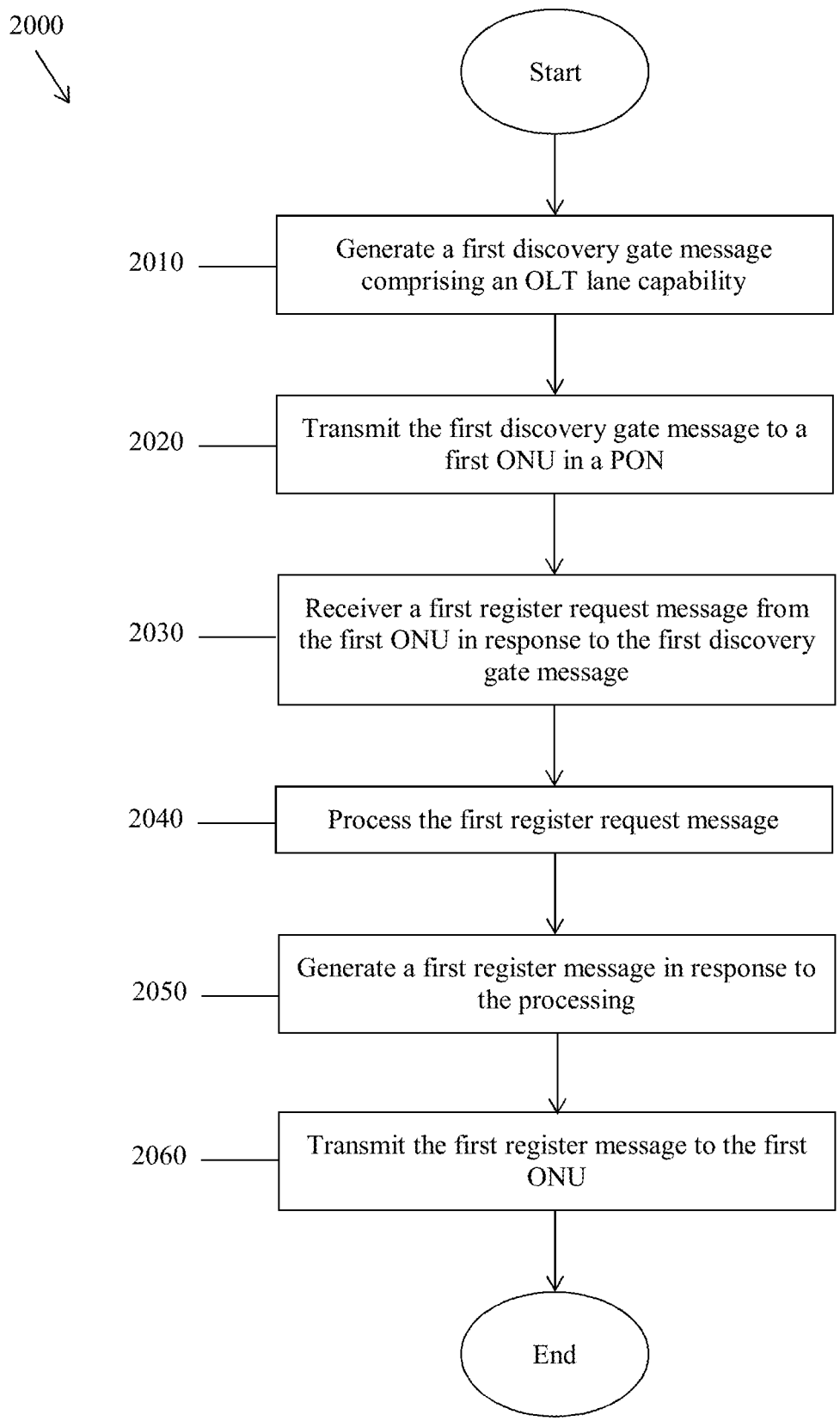
FIG. 20 is a flowchart illustrating a method of lane bonding in a PON according to an embodiment of the disclosure.

FIG. 20 is a flowchart illustrating a method 2000 of lane bonding in a PON according to an embodiment of the disclosure. The OLT 203 implements the method 2000 when the ONU 237 registers with or joins the TWDM PON 200, when the ONU 237 desires a data rate change, or at other suitable times. At step 2010, a first discovery gate message comprising an OLT lane capability is generated. For instance, the first discovery gate message is the MPCP discovery gate message in step 310 of FIG. 3, the MPCP discovery gate message described in FIG. 4, or the MPCP discovery gate message described in FIG. 10. At step 2020, the first discovery gate message is transmitted to a first ONU in a PON. For instance, the OLT 203 transmits the first discovery gate message to the ONU 237.

At step 2030, a first register request message from the first ONU is received in response to the first discovery gate message. The first register request message comprises a first ONU lane capability. For instance, the register request message is the MPCP register request message in step 320 of FIG. 3, the MPCP register request message described in FIG. 7, or the MPCP register request message described in FIG. 11. At step 2040, the first register request message is processed.

At step 2050, a first register message is generated in response to the processing. The first register message comprises a first assignment of first lanes to the first ONU. For instance, the first register message is the MPCP register message in step 330 of FIG. 3 or the MPCP register message 1600. Finally, at step 2060, the first register message is transmitter to the first ONU.

Figure 21:
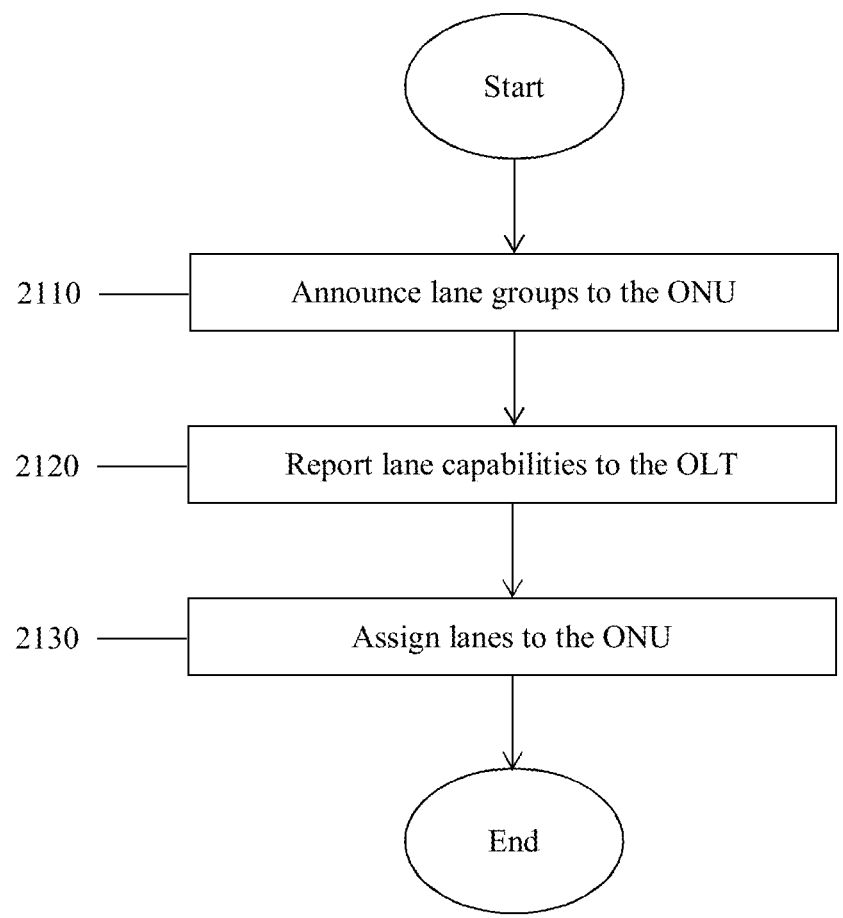
FIG. 21 is a flowchart illustrating a method of lane bonding in a PON according to another embodiment of the disclosure.

FIG. 21 is a flowchart illustrating a method 2100 of lane bonding in a PON according to another embodiment of the disclosure. The OLT 203 and the ONU 237 implement the method 2100 when the ONU 237 registers with or joins the TWDM PON 200, when the ONU 237 desires a data rate change, or at other suitable times. At step 2110, the OLT 203 announces lane groups to the ONU 237. Step 2110 may have previously occurred if the OLT 237 and the ONUE 237 are implementing the method 2100 because ONU 237 desires at a data rate change. At step 2120, the ONU 237 reports its lane capabilities to the OLT 203. In addition, the ONU 237 may request a data rate change. Finally, at step 2130, the OLT 203 assigns lanes to the ONU 237. In other words, the OLT 203 initiates lane bonding.

Figure 22:
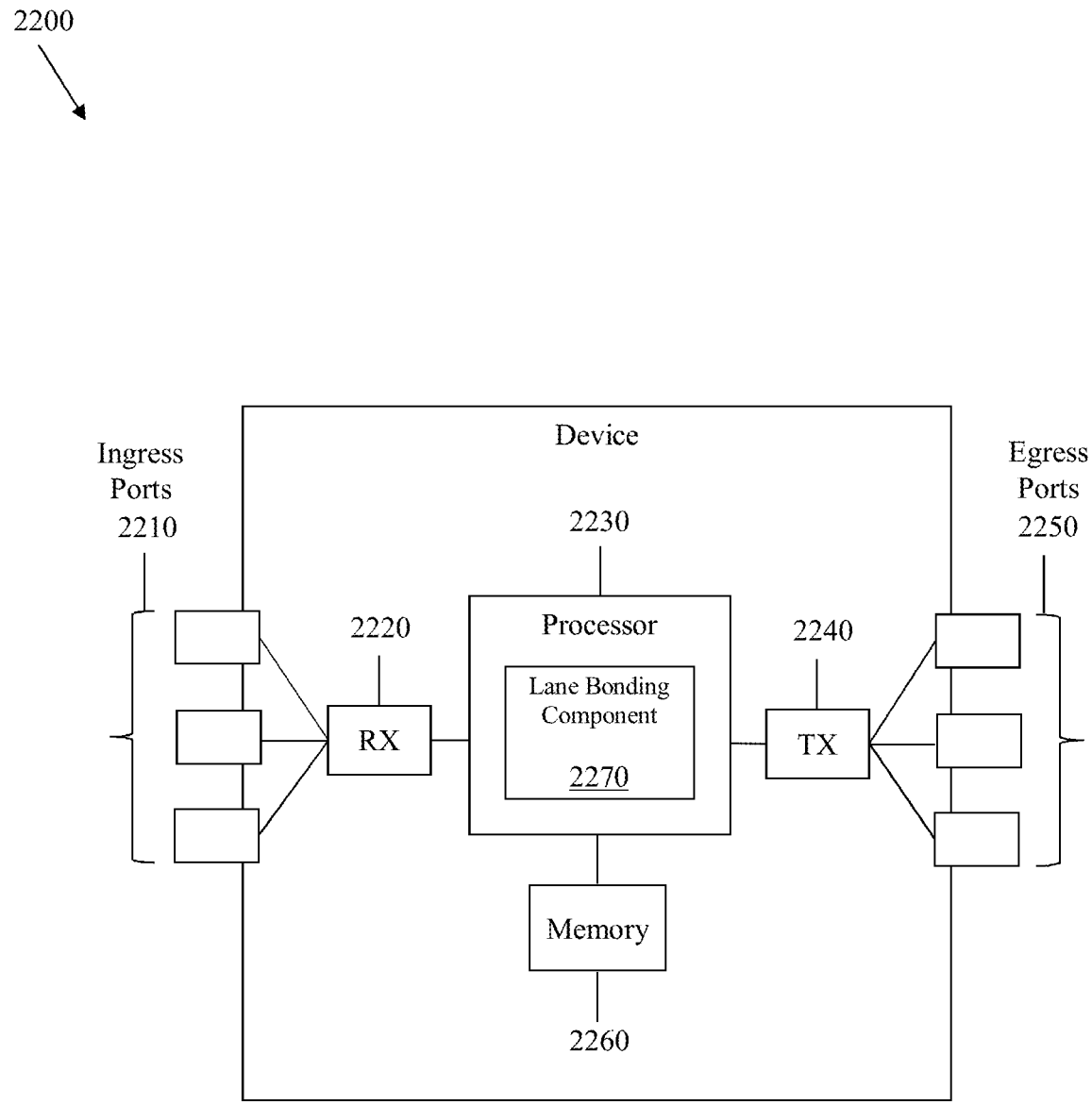
FIG. 22 is a schematic diagram of a device according to an embodiment of the disclosure.

FIG. 22 is a schematic diagram of a device 2200 according to an embodiment of the disclosure. The device 2200 may implement the disclosed embodiments, for instance the OLT 203 and the ONUs 227, 237, 247. The device 2200 comprises ingress ports 2210 and a RX 2220 for receiving data; a processor, logic unit, or CPU 2230 to process the data; a TX 2240 and egress ports 2250 for transmitting the data; and a memory 2260 for storing the data. The device 2200 may also comprise OE components and EO components coupled to the ingress ports 2210, the RX 2220, the TX 2240, and the egress ports 2250 for ingress or egress of optical or electrical signals.

The processor 2230 is any suitable combination of hardware, middleware, firmware, and/or software. The processor 2230 comprises any combination of one or more CPU chips, cores, FPGAs, ASICs, or DSPs. The processor 2230 communicates with the ingress ports 2210, RX 2220, TX 2240, egress ports 2250, and memory 2260. The processor 2230 comprises a lane bonding component 2270, which implements the disclosed embodiments. The inclusion of the lane bonding component 2270 therefore provides a substantial improvement to the functionality of the device 2200 and effects a transformation of the device 2200 to a different state. Alternatively, the memory 2260 stores the lane bonding component 2270 as instructions, and the processor 2230 executes those instructions.

The memory 2260 comprises one or more disks, tape drives, or solid-state drives. The device 2200 may use the memory 2260 as an over-flow data storage device to store programs when the device 2200 selects those programs for execution and to store instructions and data that the device 2200 reads during execution of those programs. The memory 2260 may be volatile or non-volatile and may be any combination of ROM, RAM, TCAM, or SRAM.

In an example embodiment, an apparatus comprises a processing element configured to determine a set of first lanes associated with a PON, select a subset of second lanes from the set, and perform lane bonding by bonding the subset to an ONU, and a transmitting element coupled to the processor and configured to transmit a lane bonding assignment to the ONU.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical network unit (ONU) comprising:
a processor configured to generate a register request message comprising a destination address field, a source address field, a length/type field, an operation code (opcode) field, a timestamp field, a flags field, an information field, a laser on time field, a laser off time field, a pad field, and a frame check sequence (FCS) field, the information field is 2 octets and comprises a first field indicating whether the ONU is 10 gigabit per second (G, Gb/s) upstream capable, a second field comprising only a first value or a second value indicating whether the ONU is 25G upstream capable, a third field indicating whether a 10G registration is attempted, and a fourth field indicating whether a 25G registration is attempted, the first field, the second field, the third field, and the fourth field are each 1 bit, the first value of the second field indicates an ONU transmitter is not capable of 25 Gb/s, and the second value of the second field indicates the ONU transmitter is capable of 25 Gb/s; and
a transmitter coupled to the processor and configured to transmit the register request message to an optical line terminal (OLT).

2. The ONU of claim 1, wherein the destination address field is 6 octets, the source address field is 6 octets, the length/type field is 2 octets, the opcode field is 2 octets, the timestamp field is 4 octets, the flags field is 1 octet, the laser on time field is 1 octet, the laser off time field is 1 octet, the pad field is 34 octets, and the FCS field is 4 octets.

3. The ONU of claim 1, wherein a 0 bit in the first field indicates the ONU transmitter is not capable of 10 Gb/s and a 1 bit in the first field indicates the ONU transmitter is capable of 10 Gb/s.

4. The ONU of claim 1, wherein a 0 bit in the second field indicates the ONU transmitter is not capable of 25 Gb/s and a 1 bit in the second field indicates the ONU transmitter is capable of 25 Gb/s.

5. The ONU of claim 1, wherein a 0 bit in the third field indicates a 10 Gb/s registration cannot be attempted and a 1 bit in the third field indicates a 10 Gb/s registration can be attempted.

6. The ONU of claim 1, wherein a 0 bit in the fourth field indicates a 25 Gb/s registration is not attempted and a 1 bit in the fourth field indicates a 25 Gb/s registration is attempted.

7. An optical line terminal (OLT) comprising:
a receiver configured to receive from an optical network unit (ONU) a register request message comprising a destination address field, a source address field, a length/type field, an operation code (opcode) field, a timestamp field, a flags field, an information field, a laser on time field, a laser off time field, a pad field, and a frame check sequence (FCS) field, the information field is 2 octets and comprises a first field indicating whether the ONU is 10 gigabit per second (G, Gb/s) upstream capable, a second field comprising only a first value or a second value indicating whether the ONU is 25G upstream capable, a third field indicating whether a 10G registration is attempted, and a fourth field indicating whether a 25G registration is attempted, the first field, the second field, the third field, and the fourth field are each 1 bit, the first value of the second field indicates an ONU transmitter is not capable of 25 Gb/s, and the second value of the second field indicates the ONU transmitter is capable of 25 Gb/s; and
a processor coupled to the receiver and configured to process the register request message.

8. The OLT of claim 7, wherein the destination address field is 6 octets, the source address field is 6 octets, the length/type field is 2 octets, the opcode field is 2 octets, the timestamp field is 4 octets, the flags field is 1 octet, the laser on time field is 1 octet, the laser off time field is 1 octet, the pad field is 34 octets, and the FCS field is 4 octets.

9. The OLT of claim 7, wherein a 0 bit in the first field indicates the ONU transmitter is not capable of 10 Gb/s and a 1 bit in the first field indicates the ONU transmitter is capable of 10 Gb/s.

10. The OLT of claim 7, wherein a 0 bit in the second field indicates the ONU transmitter is not capable of 25 Gb/s and a 1 bit in the second field indicates the ONU transmitter is capable of 25 Gb/s.

11. The OLT of claim 7, wherein a 0 bit in the third field indicates a 10 Gb/s registration is not attempted and a 1 bit in the third field indicates a 10 Gb/s registration is attempted.

12. The OLT of claim 7, wherein a 0 bit in the fourth field indicates a 25 Gb/s registration is not attempted and a 1 bit in the fourth field indicates a 25 Gb/s registration is attempted.

13. An optical line terminal (OLT) comprising:
a processor configured to generate a discovery message comprising a destination address field, a source address field, a length/type field, an operation code (opcode) field, a timestamp field, a start time field, a grant length field, a discovery information field, a pad field, and a frame check sequence (FCS) field, the discovery information field is 2 octets and comprises a first field indicating whether the OLT is 10 gigabit per second (G, Gb/s) upstream capable, a second field comprising only a first value or a second value indicating whether the OLT is 25G upstream capable, a third field indicating whether the OLT is opening a 10G discovery window, and a fourth field indicating whether the OLT is opening a 25G discovery window, the first field, the second field, the third field, and the fourth field are each 1 bit, the first value of the second field indicates the OLT does not support 25 Gb/s reception, and the second value of the second field indicates the OLT does support 25 Gb/s reception; and
a transmitter coupled to the processor and configured to transmit the discovery message to an optical network unit (ONU).

14. The OLT of claim 13, wherein the destination address field is 6 octets, the source address field is 6 octets, the length/type field is 2 octets, the opcode field is 2 octets, the timestamp field is 4 octets, the start time field is 4 octets, and the FCS field is 4 octets.

15. The OLT of claim 13, wherein a 0 bit in the first field indicates the OLT does not support 10 Gb/s reception and a 1 bit in the first field indicates the OLT supports 10 Gb/s reception.

16. The OLT of claim 13, wherein a 0 bit in the second field indicates the OLT does not support 25 Gb/s reception and a 1 bit in the second field indicates the OLT does support 25 Gb/s reception.

17. The OLT of claim 13, wherein a 0 bit in the third field indicates the OLT cannot receive 10 Gb/s data in this window and a 1 bit in the third field indicates the OLT can receive 10 Gb/s data in this window.

18. The OLT of claim 13, wherein a 0 bit in the fourth field indicates the OLT cannot receive 25 Gb/s data in this window and a 1 bit in the fourth field indicates the OLT can receive 25 Gb/s data in this window.

19. An optical network unit (ONU) comprising:
a receiver configured to receive from an optical line terminal (OLT) a discovery message comprising a destination address field, a source address field, a length/type field, an operation code (opcode) field, a timestamp field, a start time field, a grant length field, a discovery information field, a pad field, and a frame check sequence (FCS) field, the discovery information field is 2 octets and comprises a first field indicating whether the OLT is 10 gigabit per second (G, Gb/s) upstream capable, a second field comprising only a first value or a second value indicating whether the OLT is 25G upstream capable, a third field indicating whether the OLT is opening a 10G discovery window, and a fourth field indicating whether the OLT is opening a 25G discovery window, the first field, the second field, the third field, and the fourth field are each 1 bit, the first value of the second field indicates the OLT does not support 25 Gb/s reception, and the second value of the second field indicates the OLT does support 25 Gb/s reception; and
a processor coupled to the receiver and configured to process the discovery message.

20. The ONU of claim 19, wherein the destination address field is 6 octets, the source address field is 6 octets, the length/type field is 2 octets, the opcode field is 2 octets, the timestamp field is 4 octets, the start time field is 4 octets, and the FCS field is 4 octets, wherein a 0 bit in the first field indicates the OLT does not support 10 Gb/s reception and a 1 bit in the first field indicates the OLT supports 10 Gb/s reception, wherein a 0 bit in the second field indicates the OLT does not support 25 Gb/s reception and a 1 bit in the second field indicates the OLT does support 25 Gb/s reception, wherein a 0 bit in the third field indicates the OLT cannot receive 10 Gb/s data in this window and a 1 bit in the third field indicates the OLT can receive 10 Gb/s data in this window, and wherein a 0 bit in the fourth field indicates the OLT cannot receive 25 Gb/s data in this window and a 1 bit in the fourth field indicates the OLT can receive 25 Gb/s data in this window.

* * * * *